US007110018B2

(12) United States Patent
Sakata (10) Patent No.: US 7,110,018 B2
(45) Date of Patent: Sep. 19, 2006

(54) COMMUNICATION TERMINAL DEVICE AND CONTROL METHOD THEREOF

(75) Inventor: Tsuguhide Sakata, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 09/779,317

(22) Filed: Feb. 8, 2001

(65) Prior Publication Data

US 2002/0018115 A1    Feb. 14, 2002

(30) Foreign Application Priority Data

Feb. 10, 2000    (JP)    ............................. 2000-033250

(51) Int. Cl.
    H04N 7/14    (2006.01)
(52) U.S. Cl. .............................. 348/14.08; 348/14.01; 348/14.09
(58) Field of Classification Search .. 348/14.01–14.09, 348/14.1, 14.11, 563, 734; 709/204; 370/260–261; 345/753; 358/1.15–1.16; 379/93.05, 93.21; 715/753
    See application file for complete search history.

(56) References Cited

U.S. PATENT DOCUMENTS

| 4,376,973 | A | * | 3/1983 | Chivers ....................... 712/229 |
| 5,351,076 | A | * | 9/1994 | Hata et al. ................ 348/14.01 |
| 5,502,727 | A | * | 3/1996 | Catanzaro et al. ........... 370/271 |
| 5,650,831 | A | * | 7/1997 | Farwell ....................... 348/734 |
| 5,898,824 | A | * | 4/1999 | Kato et al. ................. 358/1.16 |
| 5,959,686 | A | * | 9/1999 | Jeong ......................... 348/563 |
| 5,999,207 | A | * | 12/1999 | Rodriguez et al. ........ 348/14.03 |
| 6,073,192 | A | * | 6/2000 | Clapp et al. .................. 710/65 |
| 6,094,213 | A | * | 7/2000 | Mun et al. ................ 348/14.05 |
| 6,266,084 | B1 | | 7/2001 | Sakata ........................ 348/207 |

FOREIGN PATENT DOCUMENTS

| JP | 07-254960 | * 10/1995 |
| JP | 9-200722 | 7/1997 |
| JP | 10-42178 | 2/1998 |

* cited by examiner

Primary Examiner—Melur Ramakrishnaiah
(74) Attorney, Agent, or Firm—Morgan & Finnegan, LLP (57) ABSTRACT

To provide a communication device that can operate conveniently in use in either of a first operation mode for unassisted operation and a second operation mode for operation under the control of an external data processor, disclosed is a communication device for communicating in video and audio with another communication device, comprising a mode setting unit for setting a first operation mode for unassisted operation or a second operation mode for operation under the control of an external data processor, an external connection interface for connecting with the external data processor, an operation unit, a communication unit for exchanging information with the other terminal device, a video input unit, a video output unit, an audio input/output unit, and a control unit that operates in accordance with an operation through the operation unit and outputs video data to be displayed to the video output unit in the first operation modes, and operates in accordance with control commands received from the external data processor through the external connection interface and transfers video data to be displayed to the external data processor in the second operation mode.

14 Claims, 7 Drawing Sheets

COMMUNICATION TERMINAL DEVICE AND CONTROL METHOD THEREOF

BACKGROUND OF THE INVENTION

1. Field of the Invention

The present invention relates to communication terminal devices and control methods thereof.

2. Related Background Art

Video conference systems based on personal computers have already been marketed. For example, Japanese Patent Application (Laid-Open) Nos. 9-200722 and 10-42178 by the applicant same as the assignee of the present application disclose such a system, which comprises a CODEC (coder and decoder) board and an ISDN (integrated services digital network) board each inserted in an extension slot of a computer, and a camera with a pan head, and includes software that operates on the computer. In such the conventional art, a monitor screen displays an operation panel as well as an image obtained through a camera. A user can control the camera operation such as panning, tilting, zooming, and focusing by manipulating a mouse and a keyboard attached to the computer. This type of video conference system based on personal computer is called DVC (desktop video conference system) type.

On the other hand, there are video conference systems that operate standalone with no computer. For example, such systems are available from Polycom as ViewStation (TM) and from PictureTel as SwiftSite II (TM). These systems are each operated through a remote controller and an image is displayed on a TV screen. The remote controller is provided with upward, downward, leftward, and rightward direction keys, a set key, a cancel key, and a menu key as its main functional keys, and additionally with a shortcut key. This type of video conference system is called STB (set top box) type because its main controller is set on a TV receiver in most cases.

Conventional DVC type video conference terminal devices have the following problems. In DVC type, installation of hardware and software into a personal computer is troublesome and highly expert knowledge of personal computer is required. Compatibility with a display card installed in the computer may come into question. Besides, even when a user wants to use the device soon, the computer must be powered first. The user must wait for start-up of the operating system and further for start-up of the dedicated application software. It requires a considerably long time.

On the other hand, STB type video conference terminal devices that operate standalone have the following problems. First, since a remote controller is used as the main control system of each device, it is unsuitable for complicated input operation. Particularly in case of making a telephone directory with Chinese characters and so on being input, the operation becomes complicated and troublesome. That is, the operability of the input means is bad. Secondly, since a remote controller is used as the main control system of each device, when two or more video conference terminal devices are close to one another, they may operate at once in response to a control signal from one remote controller and thereby be thrown into confusion. Thirdly, since a TV monitor is generally used for the display of each device, its display performance such as resolution is apt to be insufficient. In particular, a font larger than a certain size must be used for displaying a reproduced Chinese character or the like. If not so, the displayed character may be influenced by a flicker or have a blur on its profile, whereby it becomes hard to read. Fourthly, since the recording capacity of data is hard to be increased, in case of adding a static image capture function, an animation recording function, or the like, the number of images to be recorded, the recording time, or the like is apt to be limited. That is, there is a certain limit of storage capacity.

SUMMARY OF THE INVENTION

The present invention aims to solve all or at least one of the above-described problems.

It is an object of the present invention to provide a communication device having both of the convenience in the conventional DVC type video conference terminal devices and the convenience in the STB type video conference terminal devices that operate standalone.

For this object provided is a communication device for communicating in video and audio with another communication device, comprising: a mode setting means for setting a first operation mode for unassisted operation or a second operation mode for operation under the control of an external data processor; an external connection interface for connecting with the external data processor; an operation means; a communication means for exchanging information with the other terminal device; a video input means; a video output means; an audio input/output means; and a control means that operates in accordance with an operation through the operation means and outputs video data to be displayed to the video output means in the first operation modes, and operates in accordance with control commands received from the external data processor through the external connection interface and transfers video data to be displayed to the external data processor in the second operation mode.

It is a further object of the present invention to provide a communication device wherein the convenience in the DVC type video conference terminal devices and the convenience in the STB type video conference terminal devices that operate standalone are combined with each other to make the communication device easier for use.

For this object provided is a communication device having, in addition to the above feature, a characteristic feature of automatically setting the first operation mode after power is supplied and setting the second operation mode in accordance with a control instruction from the external data processor. Further provided is a communication device having, in addition to the above feature, a characteristic feature of setting the first operation mode in response to the connection state with the external data processor changing to a substantially disconnected state.

Other and further objects and features of the present invention will become apparent from the following description in connection with embodiments and drawings.

DETAILED DESCRIPTION OF THE PREFERRED EMBODIMENTS

Hereinafter, embodiments of the present invention will be described in detail with reference to the accompanying drawings.

Figure 1:
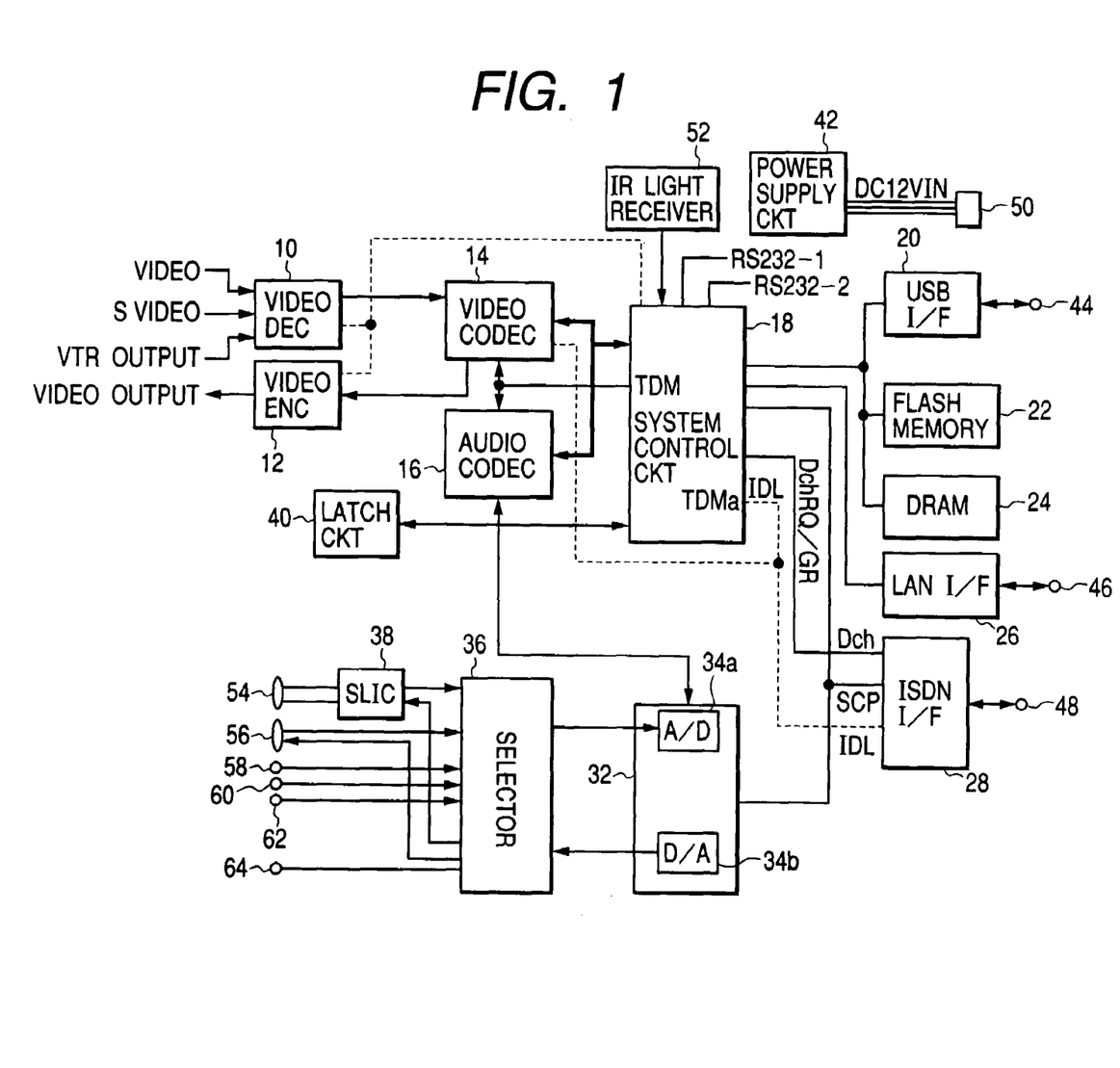
FIG. 1 is a block diagram schematically showing the construction of a communication device according to the first embodiment of the present invention.

FIG. 1 is a block diagram schematically showing the construction of a communication device according to the first embodiment of the present invention. The device includes a video decoder 10, a video encoder 12, a video CODEC (coder and decoder) 14, an audio CODEC 16, a system control circuit 18, a USB (universal serial bus) interface 20, a flash memory 22, a DRAM (dynamic random access memory) 24, a LAN (local area network) interface 26, and an ISDN interface 28. The ISDN interface 28 serves for making a connection with an ISDN line and for data transfer through the connection. The system control circuit 18 sets the operation mode of the communication device at STB (set top box) mode or DVC (digital video-cassette recorder) mode on the basis of an operation through a remote controller or a keyboard 120 and a mouse 122, which will be described later, or under the control of an installed program. The system control circuit 18 also executes various processes in the set mode.

The communication device further includes a converter system 32 comprising an audio A/D converter 34*a* and an audio D/A converter 34*b*, an audio input/output selector 36, a telephone subscriber side line interface 38, a control latch circuit 40, a power supply circuit 42, a USB connector 44, a LAN connector 46, an ISDN connector 48, a power supply terminal 50, an IR (infrared) light receiver 52 for receiving infrared rays from a remote controller, a telephone connection terminal 54, a headset connection terminal 56, a microphone input terminal 58, an audio line input terminal 60, a VTR (videotape recorder) audio input terminal 62, and an audio line output terminal 64.

Figure 2:
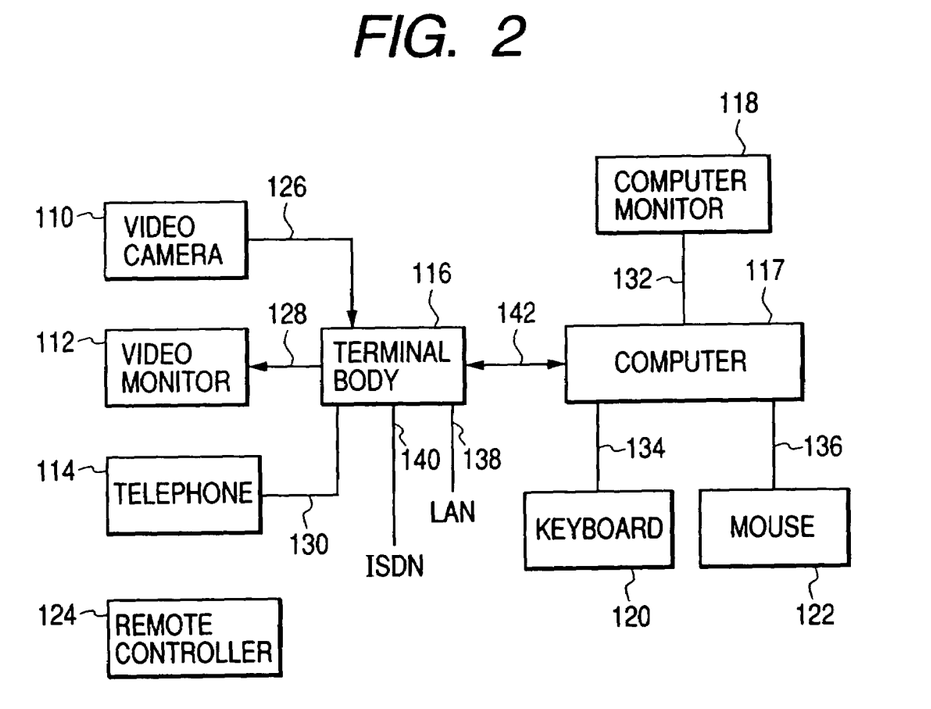
FIG. 2 is a block diagram showing a manner of connection in which the device of the first embodiment can be used as either of STB and DVC types.

FIG. 2 shows a manner of connection in which the communication device of this embodiment can be used as either of STB and DVC types. A terminal body 116 is connected with a video camera 110, a video monitor 112, a telephone 114, and a computer 117. Of course, the video camera 110 may be incorporated in the terminal body 116. The computer 117 is provided with a computer monitor 118, a keyboard 120, and a mouse 122. Also provided is an IR remote controller 124. The video camera 110 and the video monitor 112 are connected to the terminal body 116 through video cables 126 and 128, respectively. The telephone 114 is connected to the terminal body 116 through a telephone line 130. The computer monitor 118 is connected to the computer 117 through a monitor cable 132. The keyboard 120 is connected to the computer 117 through a keyboard cable 134. The mouse 122 is connected to the computer 117 through a mouse cable 136. The terminal body 116 can be connected with a LAN 138 and ISDN 140. The terminal body 116 is connected to the computer 117 through a USB cable 142. The video monitor 112 as well as the video camera 110 may be incorporated in the terminal body 116.

Figure 3:
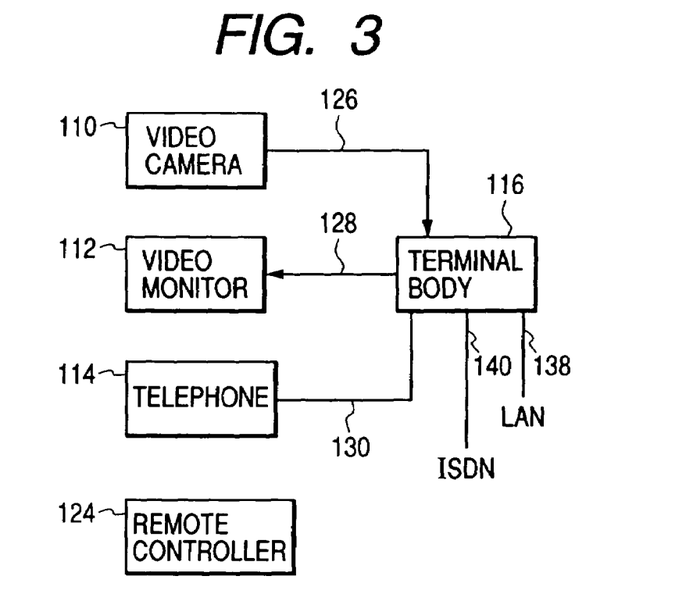
FIG. 3 is a block diagram showing a manner of connection when the device of the first embodiment is used as STB type.
Figure 4:
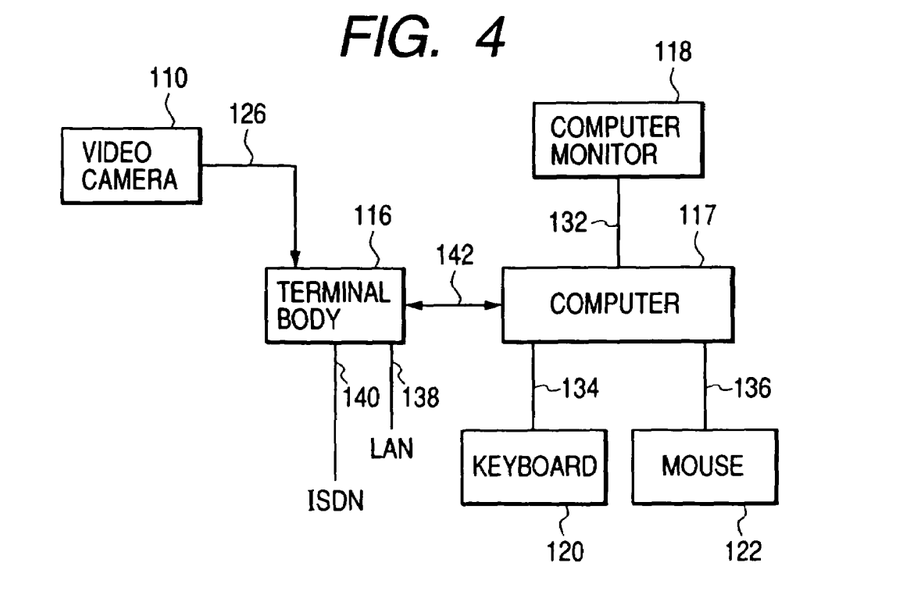
FIG. 4 is a block diagram showing a manner of connection when the device of the first embodiment is used as DVC type.

FIG. 3 shows a manner of connection when the communication device of this embodiment is used as STB type and FIG. 4 shows a manner of connection when the device is used as DVC type. In either construction shown in these figures, some components are eliminated from the construction in FIG. 2. Each component shown in these figures has the same function and operation as the corresponding one in FIG. 2, so it is denoted by the same reference numeral as in FIG. 2.

The operation and use of the communication device according to this embodiment will be described. The LAN terminal 46 and/or the ISDN terminal 48 of the terminal body 116 is connected with an existing LAN and/or ISDN through a LAN cable 138 and/or an ISDN cable 140. As shown in FIG. 2, the video camera 110 and the video monitor 112 are connected to the terminal body 116 through the video cables 126 and 128, respectively. When the telephone 114 is used for audio input/output, it is connected to the terminal body 116 through the telephone line 130. At this time, if power is supplied to this system, the communication device of this embodiment can operate in STB mode. Further, the terminal body 116 is connected through the USB cable 142 to the computer 117 that is connected with the computer monitor 118, the keyboard 120, and the mouse 122. At this time, if the computer 117 is in operation and a specific application is started therein, the communication device of this embodiment can operate also in DVC mode.

An external power supply adapter (not shown) is connected to the power supply terminal 50 to supply power to the power supply circuit 42. The power supply circuit 42 supplies a predetermined power supply voltage to each block in the system. When power is supplied, the system control circuit 18 is put in boot mode by power-on reset, jumps to a predetermined address, reads a predetermined program code out of the flash memory 22 into the DRAM 24, and then executes the program. The DRAM 24 is a memory used in executing a program and can be accessed at a higher speed than the flash memory 22. A system program resets predetermined blocks to initialize them.

In general, either of the video and audio CODEC's 14 and 16 comprises a DSP (digital signal processor) that operates in accordance with a program. Thus, after they are reset, the system control circuit 18 reads programs for the video and audio CODEC's 14 and 16 out of the flash memory 22 and writes them into SRAM's of the respective video and audio CODEC's 14 and 16 through a bus I/F (interface). After the programs are written, the system control circuit 18 sends predetermined commands to the video and audio CODEC's 14 and 16 to start the loaded programs.

Through these initializing operations in series at the time of start-up, the video conference terminal device of this embodiment becomes changeable to its normal operation state.

In the normal operation state, an analogue video output signal from the video camera 110 is first supplied to the video decoder 10. In general, the video decoder 10 is provided with some different kinds of video input terminals (e.g., a composite input terminal, an RGB (red, green, blue) input terminal, and a luminance/color-difference separation terminal). For example, on the basis of selection information from an operation switch (not shown), the system control circuit 19 instructs the video decoder 10 which video input to process. A video signal from a video source such as a VTR other than the video camera 110 may be input.

The video decoder 10 digitizes the input video signal from a selected input source to convert it into a digital signal that includes a luminance signal Y assigned, e.g., eight bits and color-difference signals CB and CR each assigned, e.g., eight bits. The video decoder 10 then supplies the digital signal to the video CODEC 14. The video CODEC 14 converts the input video data into a CIF (common intermediate format) of resolution independent of either of the NTSC (National Television System Committee) system in Japan and the United States and the PAL (phase alternation by line) system in Europe. The video CODEC 14 then compresses the amount of image data in accordance with an animation compression algorithm based on, e.g., the standard ITU-T (International Telecommunications Union) H.261. Since the specific contents of the algorithm H.261 are a matter of little interest to the present invention, the detailed description thereof is omitted here.

As for audio, for example, an external cordless telephone, an external headset, and an external microphone are connected to the telephone connection terminal 54, the headset connection terminal 56, and the microphone input terminal 58, respectively. Further, a playback output of a tape recorder and an audio output of a VTR are connected to the audio line input terminal 60 and the VTR audio input terminal 62, respectively. Out of these audio inputs, the audio input/output selector 36 selects one designated by a user. The audio input/output selector 36 supplies the selected audio signal to the audio A/D converter 34a. Information for setting the audio input/output selector 36 is set in the control latch circuit 40. The system control circuit 18 sets a certain command in the control latch circuit 40 to control the audio input/output selector 36.

In general, a DC power supply is required for use of an analogue telephone connected. In this case, the power is supplied through the line interface 38. The line interface 38 also has functions of off-hook detection of telephone receiver, generation of dial tone at off-hook, generation of ring tone, etc. The system control circuit 18 controls these functions.

The audio A/D converter 34a converts an audio signal selected by the audio input/output selector 36 into a digital signal and then supplies it to the audio CODEC 16. The audio CODEC 16 compresses the audio data on the basis of, e.g., the standard G.728.

In case of a video conference through ISDN, the standard ITU-T H.320 is used. In this case, since audio data and video data are multiplexed by a bit-base frame method according to the standard H.221, the video CODEC 14 mostly executes the multiplexing operation. Thus, in case of ISDN, audio data compressed by the audio CODEC 16 is transferred to the video CODEC 14 through serial bus. The video CODEC 14 multiplexes audio and video data and then supplies the multiplexed serial signal to the ISDN interface 28 through a TDM (time-division multiplex) bus. The ISDN interface 28 sends out the input serial data to ISDN.

The operation till a connection to ISDN is made different between STB and DVC modes. In case of STB mode, a user inputs the telephone number of the opposite party using, e.g., the IR remote controller 124 or operation means incorporated with the terminal body 116. In accordance with a remote control signal received through the IR light receiver 52 or an input operation through the incorporated operation means, the system control circuit 18 obtains information for control, e.g., on the opposite party's telephone number and the connection start timing. On the screen of the video monitor displayed is a menu for inputting made by the video CODEC 14. The user can see the menu window to operate the remote controller 124 or the operation means incorporated with the terminal body 116. In this case, a video image on the user side may also be displayed in a small window, or the inputting menu may be superimposed on the user side image. The system control circuit 18 executes a predetermined control operation on the basis of the control information. It controls the ISDN interface 28 to call the opposite party designated by the user.

In case of DVC mode, the operation is as follows. Predetermined application software is started on the computer 117. For example, a video signal is thereby transferred from the terminal body 116 to the computer 117 in ISO (isochronism) mode of USB to display the user's image on the screen of the computer monitor 118. An inputting menu or the like is displayed with graphic user interface provided in the computer 117. The user inputs control information, e.g., on the opposite party's telephone number and the connection start timing, using the keyboard 120 and the mouse 122. Alternatively, the user can input the opposite party's telephone number and the like using, e.g., the IR remote controller 124 or the operation means incorporated with the terminal body 116. The system control circuit 18 sends the control information, obtained as a remote control signal received through the IR light receiver 52, or obtained through the incorporated operation means, to the computer 117 in interruption transfer mode of USB. The application software on the computer 117 combines the thus sent pieces of control information with pieces of control information from the keyboard 120 and the mouse 122 and thereby makes a control command. The software then sends the control command to the system control circuit 18 in the terminal body 116 through USB. The system control circuit 18 executes a predetermined control operation on the basis of the control information sent from the computer 117. It controls the ISDN interface 28 to call the opposite party designated by the user.

Serial data sent out through the ISDN interface 28 to ISDN is received by a video conference terminal device of the opposite party, where images and voices are reproduced.

Video and audio serial data of the opposite party sent out from the opposite party's video conference terminal device is received through the ISDN interface 28 and sent to the video CODEC 14 through the TDM bus. The video CODEC 14 separates compressed video data from compressed audio data. The video CODEC 14 elongates the separated compressed video data to restore the video data and it supplies the compressed audio data to the audio CODEC 16. The audio CODEC 16 elongates this compressed audio data to restore the audio data.

In STB mode, the video CODEC 14 exchanges video data of the image of the user him- or herself for the restored video data or converts the restored video data into video data for picture-in-picture, and then supplies the data to the video encoder 12. The video encoder 12 converts the video data sent from the video CODEC 14, into an analogue video signal in NTSC or the like and then supplies it to the video monitor 112. In DVC mode, the video CODEC 14 exchanges video data of the image of the user him- or herself for the restored video data or converts the restored video data into video data for picture-in-picture, and then transfers the data to the computer 117 through USB. The computer 117 makes the computer monitor 118 display the image on its screen. The opposite party's image is thus displayed on the screen of the video monitor 112.

A case of a video conference through a LAN will be described next. In this case, images and voices are transferred as separate packet data based on the standard ITU-T H.323. For this reason, video data compressed by the video CODEC 14 is transferred to the system control circuit 18 through the bus I/F. The system control circuit 18 packets the video data on the basis of the standard ITU-T H.225. Audio data compressed by the audio CODEC 16 is transferred to the system control circuit 18 through the serial bus. The system control circuit 18 also packets the audio data on the basis of the standard ITU-T H.225. The system control circuit 18 sends the video and audio packet data to the LAN interface 26 via bus. The LAN interface 26 converts the input packets into a predetermined transfer format and then sends out them to LAN.

The operation for making a connection to LAN differs between STB and DVC modes. In case of STB mode, the user inputs control information on the IP address of the opposite party's terminal (or host name) and the connection start timing, using, e.g., the IR remote controller 124 or operation means incorporated with the terminal body 116. In accordance with a remote control signal received through the IR light receiver 52 or an input operation through the incorporated operation means, the system control circuit 18 obtains control information, e.g., on the IP address of the opposite party's terminal and the connection start timing. On the screen of the video monitor displayed is a menu for inputting made by the video CODEC 14. The user can see the menu window to operate the remote controller 124 or the operation means incorporated with the terminal body 116. In this case, a video image on the user side may also be displayed in a small window, or the inputting menu may be superimposed on the user side image. The system control circuit 18 executes a predetermined control operation on the basis of the control information. It controls the LAN interface 26 to transmit each packet to the opposite party's terminal designated by the user.

In case of DVC mode, the operation is as follows. Predetermined application software is started on the computer 117. For example, a video signal is thereby transferred from the terminal body 116 to the computer 117 in ISO (isochronism) mode of USB to display the user's image on the screen of the computer monitor 118. An inputting menu or the like is displayed with graphic user interface provided in the computer 117. The user inputs control information, e.g., on the IP address of the opposite party's terminal and the connection start timing, using the keyboard 120 and the mouse 122. Alternatively, the user can input the IP address and the like using, e.g., the IR remote controller 124 or the operation means incorporated with the terminal body 116. The system control circuit 18 sends the control information, obtained as a remote control signal received through the IR light receiver 52, or obtained through the incorporated operation means, to the computer 117 in interruption transfer mode of USB. The application software on the computer 117 combines the thus sent pieces of control information with pieces of control information from the keyboard 120 and the mouse 122 and thereby makes a control command. The software then sends the control command to the system control circuit 18 in the terminal body 116 through USB. The system control circuit 18 executes a predetermined control operation on the basis of the control information sent from the computer 117. It controls the LAN interface 26 to transmit each packet to the opposite party's terminal.

The packet data sent out through the LAN interface 26 to LAN is received by the designated terminal device, where images and voices are reproduced.

The LAN interface 26 also receives video and audio packet data of the opposite party sent out from the opposite party's video conference terminal device and sends out it to the system control circuit 18 through bus. The system control circuit 18 reconstructs compressed video data and compressed audio data from the packet data. The reconstructed compressed video data is sent to the video CODEC 14. The video CODEC 14 elongates the compressed video data to restore the original video data. The reconstructed compressed audio data is sent to the audio CODEC 16 through serial bus. The audio CODEC 16 elongates the compressed audio data to restore the original audio data.

In STB mode, the restored video signal is sent to the video encoder 12 after it is substituted for the user's image or converted into a picture-in-picture signal. The video encoder 12 converts the video signal into an analogue video signal in NTSC or the like and then supplies it to the video monitor 112. In DVC mode, the restored video signal is sent to the computer 117 through USB after it is substituted for the user's image or converted into a picture-in-picture signal. The computer 117 makes the computer monitor 118 display the image on its screen.

Figure 5:
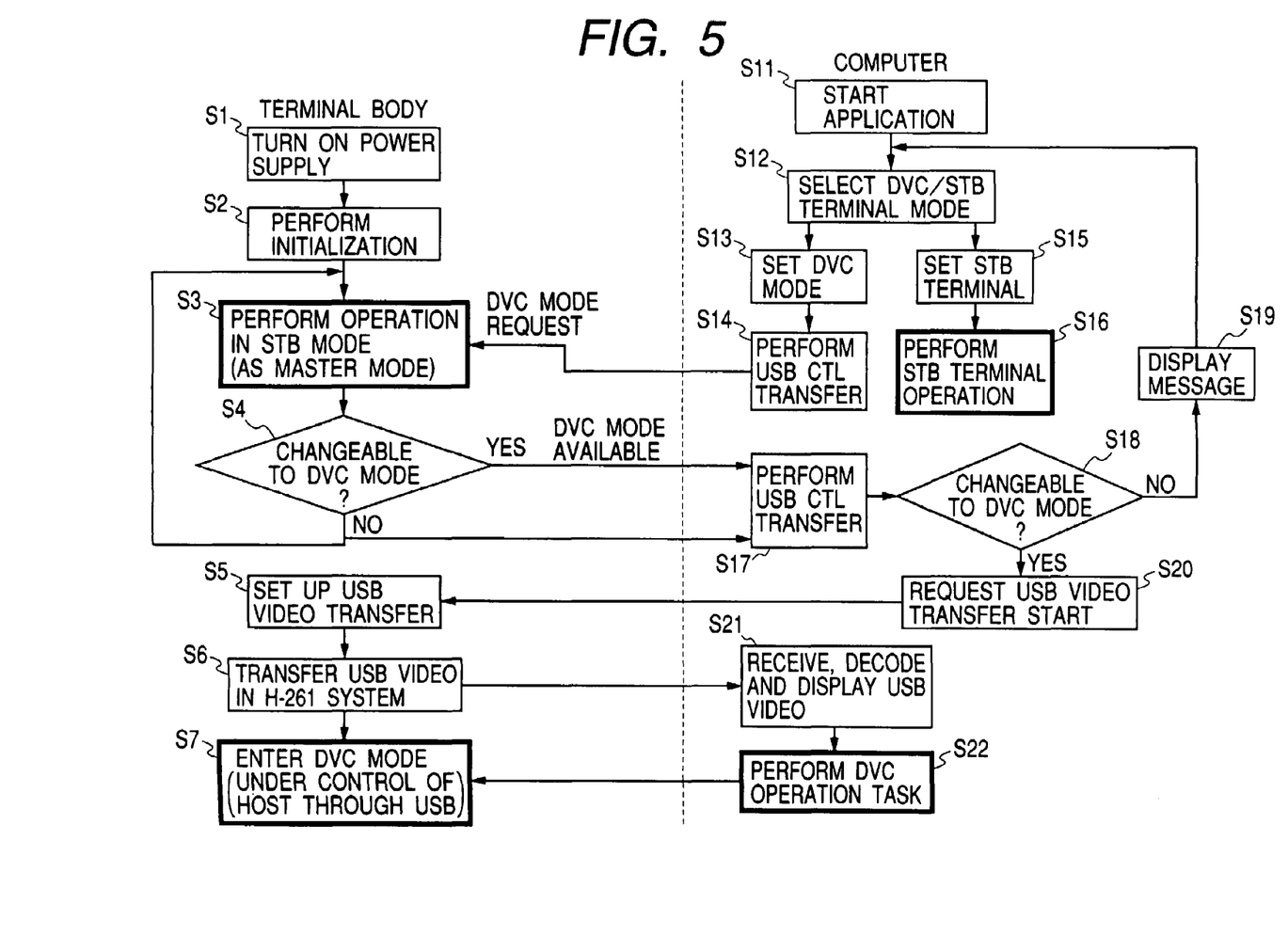
FIG. 5 is a flow chart for explaining the operation for changing the device from STB mode to DVC mode.

The operation for changing the operation mode between STB and DVC modes will be described with reference to FIG. 5. FIG. 5 shows, in its left part, an operation flow in the system control circuit 18 and, in its right part, an operation flow of application software on the computer 117.

When the terminal body 116 is powered on (S1), the above-described initializing process is executed (S2) and then the terminal body 116 is put in its normal mode, more specifically, STB mode (S3). That is, the video conference function using ISDN or LAN operates standalone. In STB mode, the system is functionally in the connection state as shown in FIG. 3. As effective operating means usable are the IR remote controller 124, operating means incorporated in the terminal body 116, and push buttons of the telephone 114. As display means usable is the video monitor 112.

When a user connects the terminal body 116 to the computer 117 through the USB cable 142, by plug & play function of USB, a predetermined enumeration operates to load predetermined USB device drivers. Predetermined application software then starts on the computer 117 in response to an operation by the user or automatically (S11). The software selects DVC or STB operation mode in accordance with a DVC/STB mode selection menu (S12). When DVC mode is selected (S12), the application software initializes USB drivers for control and video transfer in DVC mode (S13) and then transmits a DVC mode request command to the system control circuit 18 of the terminal body 116 through USB (S14).

When the system control circuit 18 of the terminal body 116 receives the DVC mode request command from the computer 117 (S3), the circuit 18 checks as to whether or not the system is changeable to DVC mode (S4). When the system can not be changed to DVC mode at that time because there is a task that is currently being processed, e.g., the system is in a video telephone communication in STB mode, the system control circuit 18 sends, together with a predetermined message, a response indicating that the system can not be changed to DVC mode, to the application software on the computer 117, so that STB mode is maintained (S3).

When the application software on the computer 117 receives the response from the terminal body 116 through USB (S17), the software judges the contents of the response (S18). When the response indicates that the system can not be changed to DVC mode, the software makes the computer monitor 118 display a message indicating that effect on its screen to inform the user (S19). The flow then returns to the step of DVC/STB selection menu (S12).

When there is no task being processed and the system can be changed to DVC mode (S4), the system control circuit 18 sends a response indicating that the system can be changed to DVC mode, to the application software on the computer 117. When receiving the response, the application software on the computer 117 transmits a video transfer request command to the terminal body 116 through USB (S20).

On the basis of the video transfer request from the computer 117, the system control circuit 18 of the terminal body 116 sets up a transfer of video data compressed by the video CODEC 14 to the computer 117 through USB (S5). The system control circuit 18 then transfers the compressed video data to the computer 117 (S6). It is of course that video data not compressed may be transferred from the terminal body 116 to the computer 117. In this case, however, the frame rate may be lowered because of a great deal of data to be transferred. After this, the system control circuit 18 enters DVC mode (S7). That is, the system control circuit 18 transfers all pieces of operation information obtained from the operation system to the computer 117 through USB. The application software on the computer 117 then judges synthetically taking operation information from the keyboard and the mouse into consideration and sends a control command to the system control circuit 18 of the terminal body 116 through USB.

Between the terminal body 116 and the computer 117, control transfer mode of USB is used for command transfer while isochronism transfer mode or bulk transfer mode of USB is used for video data transfer.

When receiving the compressed video data from the terminal body 116, the application software on the computer 117 elongates it to display (S21). For example, before making a connection of a video telephone, the image of the user him- or herself is displayed. During the connection, a video image from the opposite party's terminal is displayed. The compressed video data may be elongated by either software or hardware. In case of video data not compressed, such elongation is of course not required. After this, the application software on the computer 117 enters DVC operation mode. The software transmits a control command to the system control circuit 18 on the basis of an operation input from the system control circuit 18 and operation inputs from the keyboard, mouse, and so on (S22).

When STB operation mode is selected on the computer 117 (S12), the application software makes a setup (initialization of a USB driver for control and so on) as an STB terminal and thereafter operates as the STB terminal (S16). That is, operation information from the keyboard 120 and the mouse 122 is transferred to the system control circuit 18 of the terminal body 116 through USB and each of the keyboard 120 and the mouse 122 is used as one of operation means of the terminal body 116. On the basis of not only pieces of operation information from the IR remote controller 124, operation means incorporated with the terminal body 116, and the telephone 114 but also pieces of operation information from the computer 117, the system control circuit 18 determines the operation of each section and makes the section to execute the operation. For this USB transfer used is control transfer mode for example. By this manner, in case of a complicated input operation for Chinese characters or the like, the keyboard 120 can be used and the input result can be transmitted to the terminal body 116 after confirmation on the screen of the computer monitor 118.

Figure 6:
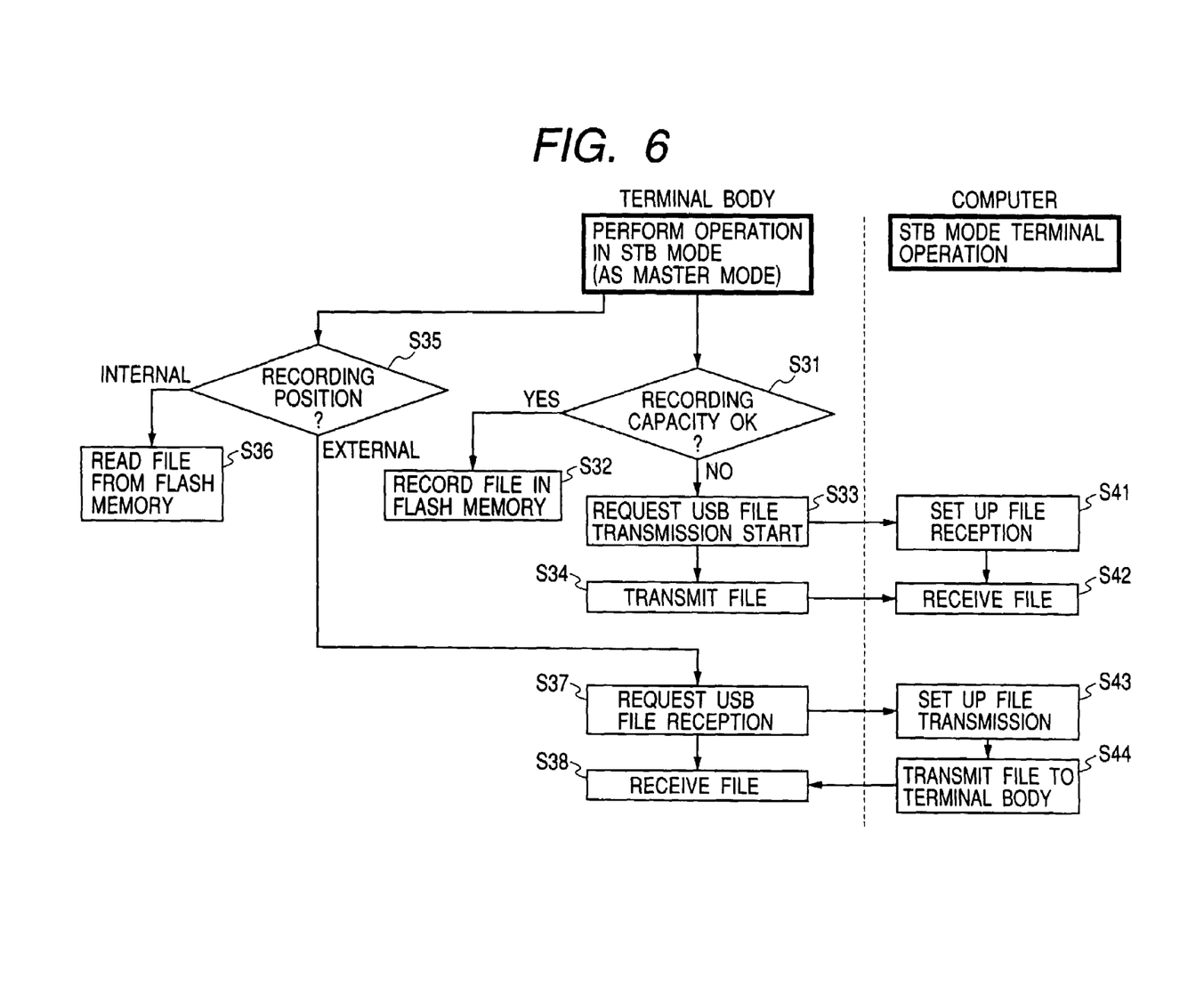
FIG. 6 is a flow chart for explaining an operation using a recording medium in a computer.

The STB terminal operation according to this embodiment will be described in detail with reference to FIG. 6. FIG. 6 shows, in its left part, an operation of the system control circuit 18 of the terminal body 116 and, in its right part, an operation of the application software on the computer 117.

For example, in case of the terminal body having a function of recording an animation or static images from the opposite party, as for animation, if it is made in CIF (352×288 pixels; eight bits for each of Y and CR/CB) at 30 FPS (frame per second), a recording capacity of 6 Mbyte/sec is required when the data is not compressed. As for static images, a recording capacity of 202 Kbyte is required for each static image. The memory capacity of the terminal body 116 may lack for recording a long time animation or a large number of static images. When the recording capacity of the terminal body 116 lacks, a resource in the computer connected through USB is used to apparently increase the memory capacity of the terminal body 116.

For example, suppose that a user captures static images in STB mode and records the static image data in the flash memory 22. In this case, the system control circuit 18 first checks as to whether or not the flash memory 22 has its space area sufficient for the static image data (S31). When the flash memory 22 has a sufficient area, the static image data is recorded in the flash memory 22 (S32). When the space area is insufficient (S31), the system control circuit 18 issues a file transmission start request and transmits it to the computer 117 (S33). The transmission start request includes a file name given by the system control circuit 18. For this transfer used is interruption transfer mode of USB for example. Simultaneously with the issuance of the transmission request, the system control circuit 18 adds, as file attribute information of the file name to be transmitted, a tag indicating of recording in an external device and records it in a predetermined area in the flash memory 22. When receiving the file transmission request command, the application software on the computer 117 sets up the reception of a data file (S41).

After the system control circuit 18 of the terminal body 116 confirms the completion of the setup of the reception (not shown), the circuit 18 starts to transmit image data (S34). The computer 117 records the image data transmitted from the terminal body 116 at a predetermined position, e.g., on a hard disk with the designated file name (S42).

When a recorded image is reproduced, the system control circuit 18 checks the recording position on the basis of a tag recorded in the flash memory 22 together with the file name (S35). When the tag added to the file name indicates external recording, the system control circuit 18 makes a file reception request and transmits it to the application software on the computer 117 through USB (S37). The file reception request command includes a file name. When receiving the file reception request command, the application software on the computer 117 searches the file having the designated file name. When the file is found (S43), the application software transmits the file to the terminal body 116 (S44). The system control circuit 18 of the terminal body 116 receives the file from the computer 117 (S38) and supplies the image data to the video CODEC 14 to convert it into a form suitable for display. The system control circuit 18 then makes the video encoder 12 convert the image data into a video signal and makes the video monitor 112 display the image on its screen.

When the recording position of the file is within the terminal body 116 (S35), the file is read out from the flash memory 22 (S36) and displayed on the screen of the video monitor 112 through the same process.

Although recording/reproducing of a static image file has been described, the same applies to an animation, audio data, and multiplex data of an animation and audio data. It is of course that data may be either compressed or not compressed.

For convenience of explanation, in this embodiment, the selection between DVC mode and STB terminal operation mode is made by application software. In this case, they may respectively correspond to separate application software components independent of each other, e.g., DVC application software and STB terminal software. For example, when the DVC application software is started, a request for changing to DVC mode is automatically issued. When the STB terminal software is started, such a request for changing to DVC mode is not issued. The system control circuit 18 of the terminal body 116 then remains in STB mode. The STB terminal software has a function of sending operation information to the system control circuit 18 and a function of transmitting a data file to and receiving a data file from the system control circuit 18.

Figure 7:
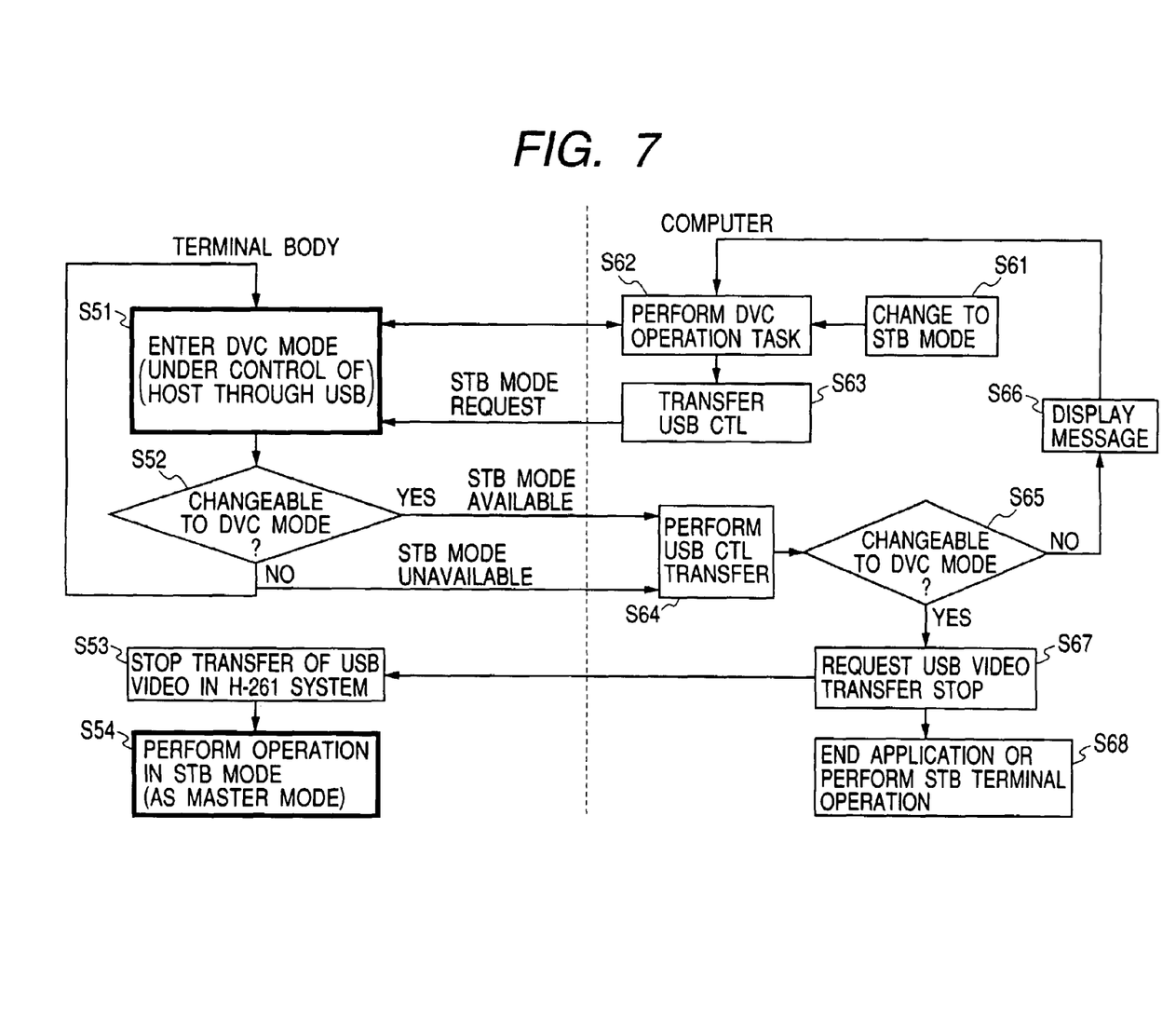
FIG. 7 is a flow chart for explaining the operation for changing the device from DVC mode to STB mode.

FIG. 7 shows a flow chart of the operation for returning the terminal body 116 from DVC mode to STB mode. FIG. 7 shows, in its left part, an operation of the system control circuit 18 of the terminal body 116 and, in its right part, an operation of application software on the computer 117.

First, a case wherein the terminal body 116 is changed to STB mode using the application software on the computer 117.

When a user operates the application software operating in DVC mode and selects an operation to end the application software or end the DVC operation so that the computer 117 is changed to operate as an STB input terminal, the terminal body 116 must be changed to STB mode. In response to such a specific operation, the application software issues a stimulation for changing to STB mode (S61), to the DVC mode task in a DVC operation (S62). When receiving the stimulation, the DVC mode task withdraws from the normal DVC mode and sends an STB mode change request command to the system control circuit 18 of the terminal body 116 through USB (S63). When the system control circuit 18 receives the USB command while it is in DVC mode, the system control circuit 18 checks as to whether or not there is a task that is being processed (S52). For example, when the terminal body 116 is in staring to receive a video telephone call from the opposite party in DVC mode, it is impossible to change to STB mode. When changing to STB mode is impossible, the system control circuit 18 sends a response indicating that changing to STB mode is impossible to the application software together with a predetermined message and keeps DVC mode (S51).

When receiving the response indicating that changing to STB mode is impossible (S64, S65), the application software on the computer 117 displays a message indicating that changing to STB mode is impossible, on the computer monitor 118 to inform the user (S66). After this, the application software returns to DVC operation mode (S62).

When there is no task being processed and changing to STB mode is possible (S52), the system control circuit 18 sends an STB mode changeable response to the application software on the computer 117. When receiving the STB mode changeable response (S64, S65), the application software sets up a video transfer stop request command and sends it to the system control circuit 18 through USB (S67). When receiving the video transfer stop request, the system control circuit 18 stops video transfer (S53). That is, the system control circuit 18 stops inputting compressed video data to the video CODEC 14 and stops transferring the compressed video data to the computer 117. After this, the system control circuit 18 enters STB mode, judges by itself operation requests from various input means, and performs a predetermined operation (S54). When the application software receives a response (not shown) to the video transfer stop request from the system control circuit 18, the application software is ended or changes to an operation as input means of an STB terminal (S68). After the end of the application software, even if power to the computer 117 is cut off, the terminal body can operate as a video telephone unit in STB mode. Since the terminal body 116 is changed to STB mode by the end operation of the application software, convenience of use is improved.

To return to STB mode by an operation of the terminal body 116, power is supplied again, the terminal body 116 is disconnected from the computer 117, or power to the computer 117 is cut off. Changing to STB mode after power is supplied was already described. When the USB cable 142 is disconnected from the terminal body 116 and when power to the computer 117 is cut off, the USB interface 20 can detect that effect. On the basis of a detection result, the system control circuit 18 is changed from DVC mode to STB mode.

In this manner, in any thinkable case, since the terminal body returns to STB mode, the video conference function can always be used.

Figure 8:
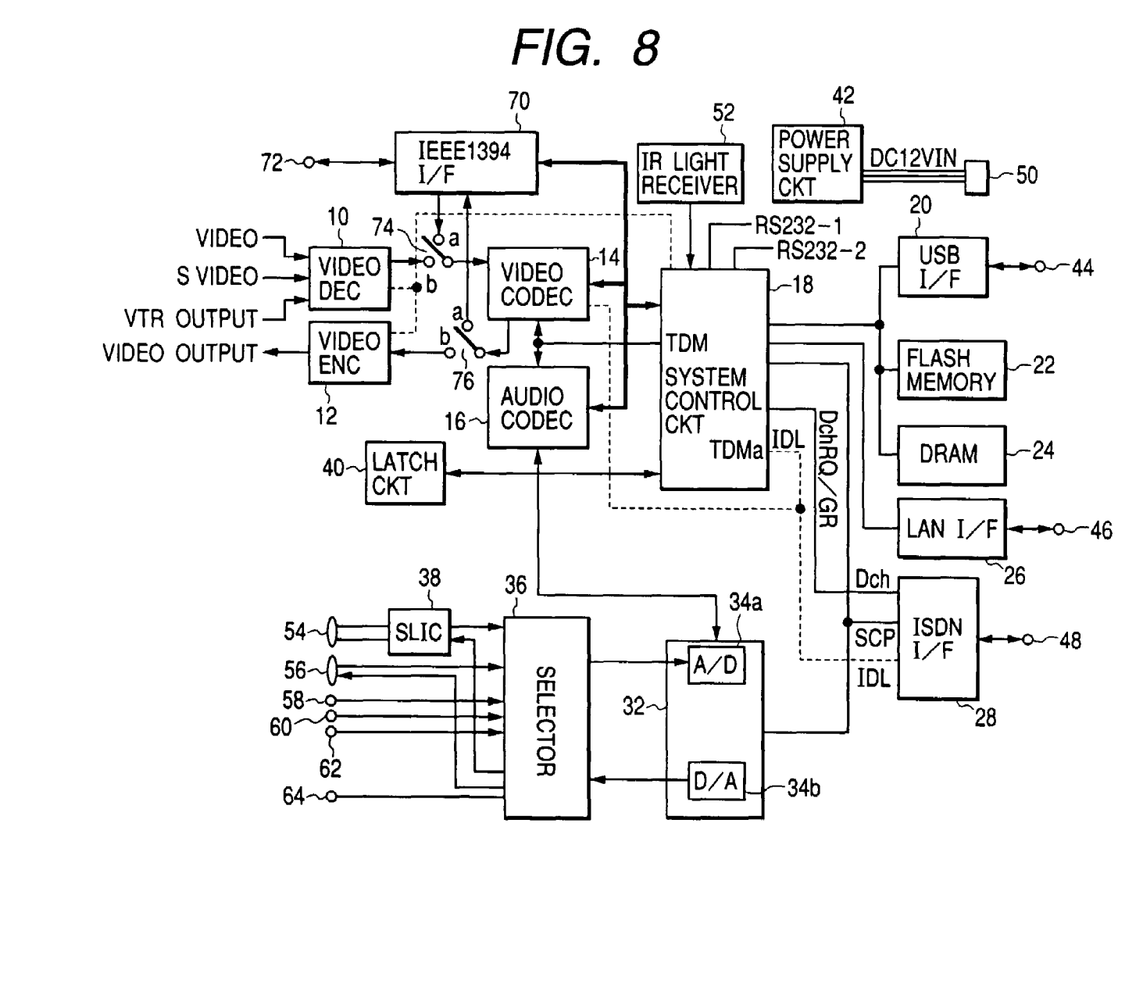
FIG. 8 is a block diagram schematically showing the construction of a communication device according to the second embodiment of the present invention.

In the above-described embodiment, the terminal body is connected to the computer using the USB cable. But it may be connected another serial cable, e.g., an IEEE1394 cable. FIG. 8 is a block diagram schematically showing the construction of the modified embodiment.

An IEEE1394 interface 70 is further connected to the bus that connects the system control circuit 18 and the video and audio CODEC's 14 and 16. An IEEE1394 connection terminal 72 is taken out from the IEEE1394 interface 70. Further provided are a video input switch 74 for selecting one of the output of the video decoder 10 and video data from the IEEE1394 interface 70 and supplying it to the video CODEC 14, and a video output switch 76 for selectively supplying video data output from the video CODEC 14 to IEEE1394 interface or the video encoder. The other construction is the same as in FIG. 1.

When as the video camera used is a usual analogue video camera, the video input switch 74 is connected to b side so that a digital video signal from the video decoder 10 is input to the video CODEC 14. When a digital video camera having AV/C protocol based upon IEEE1394 is used, the digital camera is connected to the IEEE1394 connection terminal 72 and the video input switch 74 is connected to a side. The IEEE1394 interface 70 converts video stream data output from the digital camera into video data with, e.g., a luminance signal Y (eight bits) and color-difference signals CB and CR (each eight bits) and supplies it to the video CODEC 14 through the switch 74.

In STB mode, the switch 76 is connected to b side so that the video data output of the video CODEC 14 is sent to the video encoder 12. The video encoder 12 converts the video data into an analogue video signal and supplies it to the video monitor 112. In DVC mode, the switch 76 is connected to a side so that the video data output of the video CODEC 14 is supplied to the IEEE1394 interface 70 and then sent to the computer in ISO transfer mode.

Details of the above operation will be described step by step. But the initializing operation after power is supplied is the same as in the first embodiment so the description thereof is omitted.

After entering the normal operation state, the system operates as follows. An analogue video output signal from the video camera 110 is first supplied to the video decoder 10. In general, the video decoder 10 is provided with some different kinds of video input terminals (e.g., a composite input terminal, an RGB input terminal, and a luminance/color-difference separation terminal). For example, on the basis of selection information from an operation switch (not shown), the system control circuit 19 instructs the video decoder 10 which video input to process. A video signal from a video source such as a VTR other than the video camera 110 may be input.

The video decoder 10 digitizes the input video signal from a selected input source to convert it into a digital signal that includes a luminance signal Y assigned, e.g., eight bits and color-difference signals CB and CR each assigned, e.g., eight bits. The video decoder 10 then supplies the digital signal to the video CODEC 14 through the switch 74. In this case, when as the video camera 110 used is a digital camera comprising an IEEE1394 interface, the camera is connected to the IEEE1394 connection terminal 72. The IEEE1394 interface 70 converts video data from the camera into predetermined Y, CB, and CR signals and then sends them to the video CODEC 14 through the switch 74. The video CODEC 14 converts the input video data into a common intermediate format (CIF) of resolution independent of either of the NTSC system in Japan and the United States and the PAL system in Europe. The video CODEC 14 then compresses the amount of image data in accordance with an animation compression algorithm based on, e.g., the standard ITU-T (International Telecommunications Union) H.261. Since the specific contents of the algorithm H.261 is a matter of little interest to the present invention, the detailed description thereof is omitted here.

As for audio, for example, an external cordless telephone, an external headset, and an external microphone are connected to the telephone connection terminal 54, the headset connection terminal 56, and the microphone input terminal 58, respectively. Further, a playback output of a tape recorder and an audio output of a VTR are connected to the audio line input terminal 60 and the VTR audio input terminal 62, respectively. Out of these audio inputs, the audio input/output selector 36 selects one designated by a user. The audio input/output selector 36 supplies the selected audio signal to the audio A/D converter 34a. Information for setting the audio input/output selector 36 is set in the control latch circuit 40. The system control circuit 18 sets a certain command in the control latch circuit 40 to control the audio input/output selector 36.

In general, a DC power supply is required for use of an analogue telephone connected. In this case, the power is supplied through the line interface 38. The line interface 38 also has functions of off-hook detection of telephone receiver, generation of dial tone at off-hook, generation of ring tone, etc. The system control circuit 18 controls these functions.

The audio A/D converter 34a converts an audio signal selected by the audio input/output selector 36 into a digital signal and then supplies it to the audio CODEC 16. The audio CODEC 16 compresses the audio data on the basis of, e.g., the standard G.728.

In case of a video conference through ISDN, the standard ITU-T H.320 is used. In this case, since audio data and video data are multiplexed by a bit-base frame method according to the standard H.221, the video CODEC 14 mostly executes the multiplexing operation. Thus, in case of ISDN, audio data compressed by the audio CODEC 16 is transferred to the video CODEC 14 through serial bus. The video CODEC 14 multiplexes audio and video data and then supplies the multiplexed serial signal to the ISDN interface 28 through the TDM (time-division multiplex) bus. The ISDN interface 28 sends out the input serial data to ISDN.

The operation till a connection to ISDN is made different between STB and DVC modes. In case of STB mode, a user inputs the telephone number of the opposite party using, e.g., the IR remote controller 124 or operation means incorporated with the terminal body 116. In accordance with a remote control signal received through the IR light receiver 52 or an input operation through the incorporated operation means, the system control circuit 18 obtains information for control, e.g., on the opposite party's telephone number and the connection start timing. On the screen of the video monitor displayed is a menu for inputting made by the video CODEC 14. The user can see the menu window to operate the remote controller 124 or the operation means incorporated with the terminal body 116. In this case, a video image on the user side may also be displayed in a small window, or the inputting menu may be superimposed on the user side image. The system control circuit 18 executes a predetermined control operation on the basis of the control information. It controls the ISDN interface 28 to call the opposite party designated by the user.

In case of DVC mode, the computer is connected to the terminal body 116 through the IEEE1394 cable. For convenience of explanation, we assume that the cable 142 is the IEEE1394 cable. Predetermined application software is started on the computer 117. For example, a video signal is thereby transferred from the terminal body 116 to the computer 117 in ISO mode of IEEE1394 to display the user's image on the screen of the computer monitor 118. An inputting menu or the like is displayed with graphic user interface provided in the computer 117. The user inputs control information, e.g., on the opposite party's telephone number and the connection start timing, using the keyboard 120 and the mouse 122. Alternatively, the user can input the opposite party's telephone number and the like using, e.g., the IR remote controller 124 or the operation means incorporated with the terminal body 116. The system control circuit 18 obtains the control information, e.g., on the opposite party's telephone number and the connection start timing in accordance with a remote control signal received through the IR light receiver 52, or an input operation through the incorporated operation means. The system control circuit 18 sends the control information to the computer 117 in asynchronous transfer mode of IEEE1394. The application software on the computer 117 combines the thus sent pieces of control information with pieces of control information from the keyboard 120 and the mouse 122 and thereby makes a control command. The software then sends the control command to the system control circuit 18 of the terminal body 116 in asynchronous transfer mode of IEEE1394. The system control circuit 18 executes a predetermined control operation on the basis of the control information sent from the computer 117. It controls the ISDN interface 28 to call the opposite party designated by the user.

Serial data sent out through the ISDN interface 28 to ISDN is received by a video conference terminal device of the opposite party, where images and voices are reproduced.

Video and audio serial data of the opposite party sent out from the opposite party's video conference terminal device is received through the ISDN interface 28 and sent to the video CODEC 14 through the TDM bus. The video CODEC 14 separates compressed video data from compressed audio data. The video CODEC 14 elongates the separated compressed video data to restore the video data and it supplies the compressed audio data to the audio CODEC 16. The audio CODEC 16 elongates this compressed audio data to restore the audio data.

In STB mode, the video CODEC 14 exchanges video data of the image of the user him- or herself for the restored video data or converts the restored video data into video data for picture-in-picture, and then supplies the data to the video encoder 12 through the switch 76. The video encoder 12 converts the video data sent from the video CODEC 14, into an analogue video signal in NTSC or the like and then supplies it to the video monitor 112. In DVC mode, the video CODEC 14 exchanges video data of the image of the user him- or herself for the restored video data or converts the restored video data into video data for picture-in-picture, and then transfers the data to the computer 117 through the IEEE1394 interface 70 in ISO transfer mode. The computer 117 makes the computer monitor 118 display the image on its screen. The opposite party's image is thus displayed on the screen of the video monitor 112.

A case of a video conference through a LAN will be described next. In this case, images and voices are transferred as separate packet data based on the standard ITU-T H.323. For this reason, video data compressed by the video CODEC 14 is transferred to the system control circuit 18 through the bus I/F. The system control circuit 18 packets the video data on the basis of the standard ITU-T H.225. Audio data compressed by the audio CODEC 16 is transferred to the system control circuit 18 through the serial bus. The system control circuit 18 also packets the audio data on the basis of the standard ITU-T H.225. The system control circuit 18 sends the video and audio packet data to the LAN interface 26 via bus. The LAN interface 26 converts the input packets into a predetermined transfer format and then sends out them to LAN.

The operation for making a connection to LAN differs between STB and DVC modes. In case of STB mode, the user inputs control information on the IP address of the opposite party's terminal (or host name) and the connection start timing, using, e.g., the IR remote controller 124 or operation means incorporated with the terminal body 116. In accordance with a remote control signal received through the IR light receiver 52 or an input operation through the incorporated operation means, the system control circuit 18 obtains control information, e.g., on the IP address of the opposite party's terminal and the connection start timing. On the screen of the video monitor displayed is a menu for inputting made by the video CODEC 14. The user can see the menu window to operate the remote controller 124 or the operation means incorporated with the terminal body 116. In this case, a video image on the user side may also be displayed in a small window, or the inputting menu may be superimposed on the user side image. The system control circuit 18 executes a predetermined control operation on the basis of the control information. It controls the LAN interface 26 to transmit each packet to the opposite party's terminal designated by the user.

In case of DVC mode, the operation is as follows. Predetermined application software is started on the computer 117. For example, a video signal is thereby transferred from the terminal body 116 to the computer 117 in ISO mode of IEEE1394 to display the user's image on the screen of the computer monitor 118. An inputting menu or the like is displayed with graphic user interface provided in the computer 117. The user inputs control information, e.g., on the IP address of the opposite party's terminal and the connection start timing, using the keyboard 120 and the mouse 122. Alternatively, the user can input the IP address and the like using, e.g., the IR remote controller 124 or the operation means incorporated with the terminal body 116. The system control circuit 18 obtains the control information, e.g., on the IP address of the opposite party's terminal and the connection start timing in accordance with a remote control signal received through the IR light receiver 52, or an input operation through the incorporated operation means. The system control circuit 18 sends the control information to the computer 117 in asynchronous transfer mode of IEEE1394. The application software on the computer 117 combines the thus sent pieces of control information with pieces of control information from the keyboard 120 and the mouse 122 and thereby makes a control command. The software then sends the control command to the system control circuit 18 in the terminal body 116 through USB. The system control circuit 18 executes a predetermined control operation on the basis of the control information sent from the computer 117. It controls the LAN interface 26 to transmit each packet to the opposite party's terminal.

The packet data sent out through the LAN interface 26 to LAN is received by the designated terminal device, where images and voices are reproduced.

The LAN interface 26 also receives video and audio packet data of the opposite party sent out from the opposite party's video conference terminal device and sends out it to the system control circuit 18 through bus. The system control circuit 18 reconstructs compressed video data and compressed audio data from the packet data. The reconstructed compressed video data is sent to the video CODEC 14. The video CODEC 14 elongates the compressed video data to restore the original video data. The reconstructed compressed audio data is sent to the audio CODEC 16 through serial bus. The audio CODEC 16 elongates the compressed audio data to restore the original audio data.

In STB mode, the restored video signal is sent to the video encoder 12 through the switch 76 after it is substituted for the user's image or converted into a picture-in-picture signal. The video encoder 12 converts the video signal into an analogue video signal in NTSC or the like and then supplies it to the video monitor 112. In DVC mode, the restored video signal is sent to the computer 117 through the switch 76 and the IEEE1394 interface 70 in ISO mode of IEEE1394 after it is substituted for the user's image or converted into a picture-in-picture signal. The computer 117 makes the computer monitor 118 display the image on its screen.

The operations for changing between STB and DVC modes shown in FIGS. 5 to 7 fundamentally apply also to this embodiment if "IEEE1394", "asynchronous transfer of IEEE1394", and "ISO transfer of IEEE1394" are substituted for "USB", "USB control transfer", and "ISO transfer of USB" in FIGS. 5 to 7, respectively. So, the description thereof is omitted here.

IEEE1394 operates at a higher speed than USB. Therefore, this embodiment differs from the embodiment of USB on the point that video data not compressed can also be transferred to the computer. Of course, if the transfer rate of USB becomes sufficiently higher, video data not compressed can be transferred even through USB. When video data not compressed is transferred, processing for elongation on the computer becomes unnecessary. Although the embodiments in relation to a video conference terminal device have been described, the present invention is not limited to such a video conference but can be applied to so-called multimedia communication devices.

The present invention may be applied to a system made up from a plurality of devices or a system comprising only a single device.

Besides, the scope of the present invention also includes an implementation wherein a computer in a device or system connected to various devices is supplied with software program codes for realizing the functions of the above-described embodiments and the computer (CPU or MPU) in the device or system causes the various devices to operate in accordance with the installed program and realize the above functions of the embodiments.

In this case, the software program codes themselves realize the above functions of the embodiments. Thus the present invention includes the program codes themselves and further means for supplying the program codes to the computer, e.g., a storage medium storing the program codes. Such a storage medium storing the program codes can be a floppy disk, a hard disk, an optical disk, an optical magnetic disk, a CD-ROM, a magnetic tape, a nonvolatile memory card, or a ROM.

Besides, not only in case that the above functions of the embodiments are realized by a computer executing supplied program codes but also in case that the above functions of the embodiments are realized by the program codes associating with OS (Operating System) or another application software program operating on the computer, such program codes are included in the present invention.

Further, the present invention also includes a case that supplied program codes are stored in a memory provided in a function extension board in a computer or a function extension unit connected to the computer and then a CPU or the like provided in the function extension board or unit executes part or the whole of actual processing on the basis of instructions of the program codes to realize the above functions of the embodiments.

According to the above-described embodiments, use in combination with a computer becomes easy and convenient functions of the computer can fully be put in practical use. For example, the communication device may not be made in the form of an extension board of the computer and installing the corresponding hardware component to the computer becomes unnecessary. Installing DVC software also becomes easy. A problem in compatibility with a display board incorporated in the computer does not arise. The communication device is usable even while the computer is powered off. Start-up from the power-off state is quick. A complicated input operation for Chinese characters and so on can be treated by the computer. Since input means other than IR remote controllers can be used, even when a plurality of video conference terminal devices exist, confusion can be avoided. Display means for information that requires a high display resolution, such as a Chinese character, can easily be add. Besides, in response to power-on of the computer, or in response to the connection between the communication device and the computer being made after computer is powered on, the device is changed to DVC mode. Thus the device can easily be changed in a more minute operation environment. Besides, in response to power-off of the computer, or in response to the communication device being disconnected from the computer, the device is changed to STB mode. Thus, even if the computer becomes impossible to use, under the control of the communication device body, the device can quickly be changed in a state that a video conference is possible.

As easily understood from the above description, according to the present invention, when being operated singly, a video signal is output in accordance with an operation of operation means and, when operating by an external operation, the video signal is externally output. Thus convenience of use is improved.

The present invention is never limited to the above-described embodiments and various modifications and changes can be made within the scope of the appended claims.

What is claimed is:

1. A communication device for communicating in video and audio with other terminal device, comprising:
    mode setting means for setting one of a first operation mode for unassisted operation by an external data processor and a second operation mode for operation under the control of said external data processor;
    an external connection interface for connecting with said external data processor;
    communication means for exchanging information with said other terminal device;
    control means that operates in accordance with an operation through operation means of the communicating device in said first operation modes, and operates in accordance with control commands received from said external data processor through said external connection interface in said second operation mode;
    check means that checks whether a task is being processed for communicating with said other terminal device in case of said second operation mode; and
    inhibition means for inhibiting change from said second operation mode to said first operation mode, while the task is being processed.

2. A device according to claim 1, wherein said mode setting means automatically sets said first operation mode after power is supplied and sets said second operation mode in accordance with a control instruction from said external data processor.

3. A device according to claim 1, wherein said mode setting means sets said first operation mode in response to the connection state with said external data processor changing to a substantially disconnected state.

4. A device according to claim 1, wherein said control means operates also in accordance with a control signal from said external data processor in said first operation mode.

5. A device according to claim 1, further comprising:
    a recording medium; and
    recording management means for recording data to be recorded in said external data processor when said recording medium has its space area less than a predetermined amount, and recording, on said recording medium, management information indicating that said data is recorded in said external data processor.

6. A device according to claim 5, wherein said recording management means checks on the basis of said management information as to whether or not data to be reproduced exists in said recording medium, and reproduces said data when it exists in said recording medium and requests said external data processor to transfer said data when it exists in said external data processor.

7. A control method of a communication device for communicating in video and audio with other terminal device, said communication device having a first operation mode in which said communication device operates on the basis of an operation through its own operation means and a second operation mode in which said communication device operates under the control of an external data processor, said method comprising:
    an operation mode setting step;
    a first operation step for operating said communication device in accordance with an operation through said operation means when said first operation mode is set in said operation mode setting step;
    a second operation step for operating said communication device in accordance with control commands from said external data processor when said second operation mode is set in said operation mode setting step;

a check step for checking whether a task is being processed for communicating with said other terminal device in case of second operation mode; and inhibition step for inhibiting change from said second operation mode to said first operation mode, while the task is being processed.

8. A method according to claim 7, wherein said first operation mode is automatically set after power is supplied and said second operation mode is set in accordance with a control instruction from said external data processor in said operation mode setting step.

9. A method according to claim 7, wherein said first operation mode is set in response to the connection state with said external data processor changing to a substantially disconnected state in said operation mode setting step.

10. A method according to claim 7, wherein said communication device operates also in accordance with a control signal from said external data processor in said first operation mode.

11. A method according to claim 7, further comprising a recording management step for recording data to be recorded in said external data processor when a recording medium has its space area less than a predetermined amount, and recording, on said recording medium, management information indicating that said data is recorded in said external data processor.

12. A method according to claim 7, further comprising a reproducing step for checking on the basis of said management information as to whether or not data to be reproduced exists in said recording medium, and reproducing said data when it exists in said recording medium and requesting said external data processor to transfer said data when it exists in said external data processor.

13. A computer program product for communicating an image with other terminal device with a computer readable medium, comprising:

program code for setting a first operation mode or a second operation mode;

program code for connecting a connection interface with an external data processor;

operation step;

program code for communicating with the external data processor connected via said connection interface;

program code for checking whether a task is being processed for communicating with said other terminal in case of second operation mode; and program code for inhibiting change from said second operation mode to said first operation mode, while the task is processed.

14. A communication device for communicating in video and audio with other terminal device, comprising:

mode setting unit for setting one of a first operation mode for unassisted operation by an external data processor and a second operation mode for operation under the control of said external data processor;

an external connection interface for connecting with said external data processor;

communication unit for exchanging information with said other terminal device;

control unit that operates in accordance with an operation through an operation unit of the communicating device in said first operation modes, and operates in accordance with control commands received from said external data processor through said external connection interface in said second operation mode;

check unit that checks whether a task is being processed for communicating with said other terminal device in case of said second operation mode; and inhibition unit for inhibiting change from said second operation mode to said first operation mode, while the task is being processed.

* * * * *